United States Patent

Sekiya

(10) Patent No.: US 6,371,100 B2
(45) Date of Patent: Apr. 16, 2002

(54) MACHINING APPARATUS CAPABLE OF SAVING DIFFERENT FLUIDS IN MACHINING

(75) Inventor: Kazuma Sekiya, Tokyo (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 09/779,525

(22) Filed: Feb. 9, 2001

(30) Foreign Application Priority Data

Mar. 15, 2000 (JP) .......................................... 2000-072160

(51) Int. Cl.⁷ ................................................ B28D 1/04
(52) U.S. Cl. ...................... 125/13.01; 451/488; 451/449
(58) Field of Search ........................... 125/13.01, 11.22; 451/449, 488, 53, 450, 451, 285, 286, 287, 288

(56) References Cited

U.S. PATENT DOCUMENTS

| 4,705,016 A | * | 11/1987 | Sekiya | ...................... 125/13 R |
| 5,632,667 A | * | 5/1997 | Earl et al. | ...................... 451/41 |
| 5,827,112 A | * | 10/1998 | Ball | .............................. 451/21 |
| 5,971,839 A | * | 10/1999 | Schmelzer | ................... 451/456 |
| 6,171,176 B1 | * | 1/2001 | Kajiyama et al. | .............. 451/28 |

* cited by examiner

Primary Examiner—Timothy V. Eley
Assistant Examiner—Dung Van Nguyen
(74) Attorney, Agent, or Firm—Rader, Fishman & Grauer. PLLC

(57) ABSTRACT

In order to provide a machining apparatus which can save fluids such as water, compressed air and clean air, it comprises at least a spindle unit including a rotary spindle having a machining element attached thereto for effecting a required machining work on a workpiece and a spindle housing rotatably bearing the rotary spindle, and means for supplying the spindle unit with fluid for use in machining the workpiece. The means for supplying the spindle unit with fluid has a flow control provided in the fluid flowing passage for controlling the flow rate of the fluid in response to the rotating and stopping of the rotary spindle, thereby saving such fluid. Also, a controlled small quantity of such fluid is allowed to flow in the spindle housing after the machining is stopped, thereby retaining the thermal condition without being changed until the machining is resumed. Thus, no thermal calibration is required when the machining apparatus resumes work.

5 Claims, 7 Drawing Sheets

MACHINING APPARATUS CAPABLE OF SAVING DIFFERENT FLUIDS IN MACHINING

BACKGROUND OF THE INVENTION

1. Field of the Invention

The present invention relates to a machining apparatus for use in cutting, grinding or effecting any other machining.

2. Related Arts

Referring to FIG. 9, a dicing apparatus for cutting semiconductor wafers into small square pieces has a spindle unit 24 equipped therewith. The spindle unit 24 has a rotary spindle 22 air-borne in its spindle housing 23 by ejecting air streams from radial bearings 39 and thrust bearings 40 at an increased pressure. Thus, the rotary spindle 22 having a dicing blade 18 fixed to its end is floated in non-contact condition within the spindle housing 23. Even when the rotary spindle 22 is not rotating, the high-pressure air is supplied from a high-pressure air source 43 to the spindle housing 23 via an associated air channel 41. As shown, the rotary spindle 22 is integrally connected to the shaft of a synchronous motor 29a. When the synchronous motor 29a is driven, the rotary spindle 22 and the dicing blade 18 are rotated.

While the dicing blade 18 is rotated at an increased speed, the spindle unit 24 is lowered, and then, water is ejected from a pair of water nozzles 94 toward a semiconductor wafer W, which is carried and moved back and forth by the chuck table 15 of the dicing apparatus, thereby permitting the dicing blade 18 to cut the semiconductor wafer W.

Rotation of the rotary spindle 22 at an increased speed will cause thermal expansion of the rotary spindle 22 and spindle housing 23, thus allowing the dicing blade 18 to be displaced relative to the semiconductor wafer W. The deviation thus caused adversely affects the accuracy of the cutting. Cooling water is supplied to the spindle housing 23 ceaselessly even when the rotary spindle 22 is not rotating, thus cooling the spindle 22 with the result that the dicing blade 18 is prevented from moving apart from the correct position. With recourse to this remedy, however, a lot of cooling water is required uneconomically.

While dicing a semiconductor wafer, cooling water is ejected to the machining area to produce a debris-abundant mist by cutting the semiconductor substance, thus causing some parts of the machining apparatus to be contaminated with the debris when exposed to such mist. To prevent such contamination it is necessary that the debris-abundant mist be purged from the machining area to the outside. The dicing apparatus, however, is installed in the air-cleaning room. Clean air, therefore, is removed from the air-cleaning room all the time. This is uneconomical because air-cleaning costs much.

The rotary spindle 22 needs to be kept in floating condition all the time by applying high-pressure air to the rotary spindle 22 via the radial and thrust bearings 39 and 40. This is uneconomical, too.

Any machining apparatus having a machining tool attached to its rotary spindle other than the dicing apparatus has the same problem as described above.

SUMMARY OF THE INVENTION

One object of the present invention is to provide a machining apparatus having a machining tool attached to its spindle, which can save fluids such as water, compressed air and clean air.

To attain this object a machining apparatus comprising: at least means for holding a workpiece to be machined; a spindle unit comprising a rotary spindle having a machining element attached thereto for effecting a required machining work on the workpiece and a spindle housing rotatably bearing said rotary spindle; and means for supplying said spindle unit with fluid for use in machining said workpiece, is improved according to the present invention in that said means for supplying said spindle unit with fluid includes a flow control provided in the fluid flowing passage for controlling the flow rate of said fluid in response to the rotating and stopping of said rotary spindle.

Said means for supplying said spindle unit with fluid may comprise at least a cooling water source, a coolant feeding conduit for feeding said spindle housing with cooling water, and a coolant draining conduit for draining all the cooling water from said spindle housing after use; said coolant feeding conduit having a first control valve as said flow control, thereby reducing or stopping cooling water to said spindle housing when said rotary spindle is not rotating.

Said spindle housing may have a pneumatic bearing for bearing said rotary spindle with high-pressure air, said spindle housing being connected to a high-pressure air supply via an associated air duct.

Said air duct may be equipped with a second control valve as air flow control, which is responsive to non-rotating of said rotary spindle for preventing the high-pressure air from flowing to said spindle housing.

A machining apparatus may further comprise demisting means for drawing and removing the mist from the working area where the machining element confronts the workpiece, allowing machining liquid to sputter in the form of mist, said demisting means including a duct opening at the working area for drawing the mist from the working area, said duct being equipped with a flow control.

Said flow control may comprise a fan and/or a third control valve, which may be made to stop its rotation or may be closed in response to absence of mist.

Other objects and advantages of the present invention will be understood from the following description of a machining apparatus according to one preferred embodiment of the present invention, which is shown in accompanying drawings.

DETAILED DESCRIPTION OF PREFERRED EMBODIMENT

Figure 1:
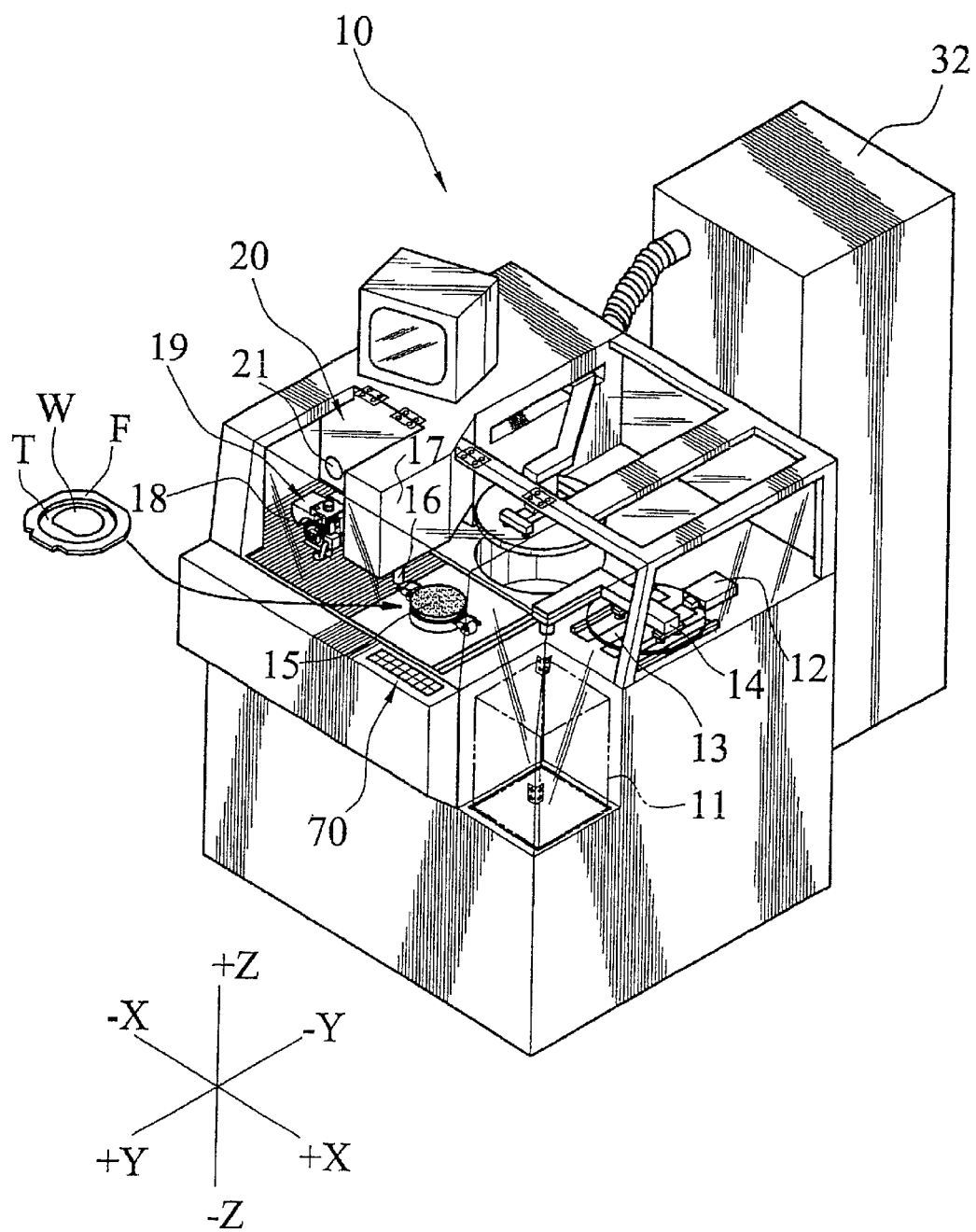
FIG. 1 is a perspective view of a dicing apparatus to which the present invention can be applied.

FIG. 1 shows a dicing apparatus 10 to which the present invention can be applied. It can be used in cutting semiconductor wafers into small square pieces. A frame F has a semiconductor wafer W attached thereto with an adhesive sheet T. A plurality of frames each having a semiconductor wafer W attached thereto are stored in a cassette 11.

These frames are transferred one by one from the cassette 11 to the tentative storage area 13 with the aid of taking out-and-putting in means 12, and the frame F is transferred from the tentative storage area 13 to the chuck table 15 with the aid of a first transferring means 14.

Then, the chuck table 15 is moved in the -X-direction to be put just below the picture-taking means 16. From the picture of the semiconductor wafer W thus taken by the picture-taking means 16, the alignment means 17 locates a selected street along which the semiconductor wafer W is to be cut. The semiconductor wafer W is moved in the -X-direction, allowing the cutting means 19 to cut the semiconductor wafer W along the so located street with the dicing blade 18 while machining water is ejected toward the machining area. Every time the semiconductor wafer W is cut along a selected street, the semiconductor wafer W is displaced a street-to-street distance laterally in the Y-axial direction to resume the cutting of the semiconductor wafer along another street by moving the chuck table 15 in the X-axial direction.

After completing the cutting of all streets in same directions, the chuck table 15 bearing the semiconductor wafer W is made to turn 90 degrees, and then the cutting is resumed and repeated in the orthogonal direction in the same way as described above. Thus, the semiconductor wafer W is cut into small squares.

The mist is produced in the machining area 20 from the scattering of water and debris. The debris-abundant mist thus produced is sucked and removed from the dust opening 21 to the outside of the dicing apparatus 10.

Figure 2:
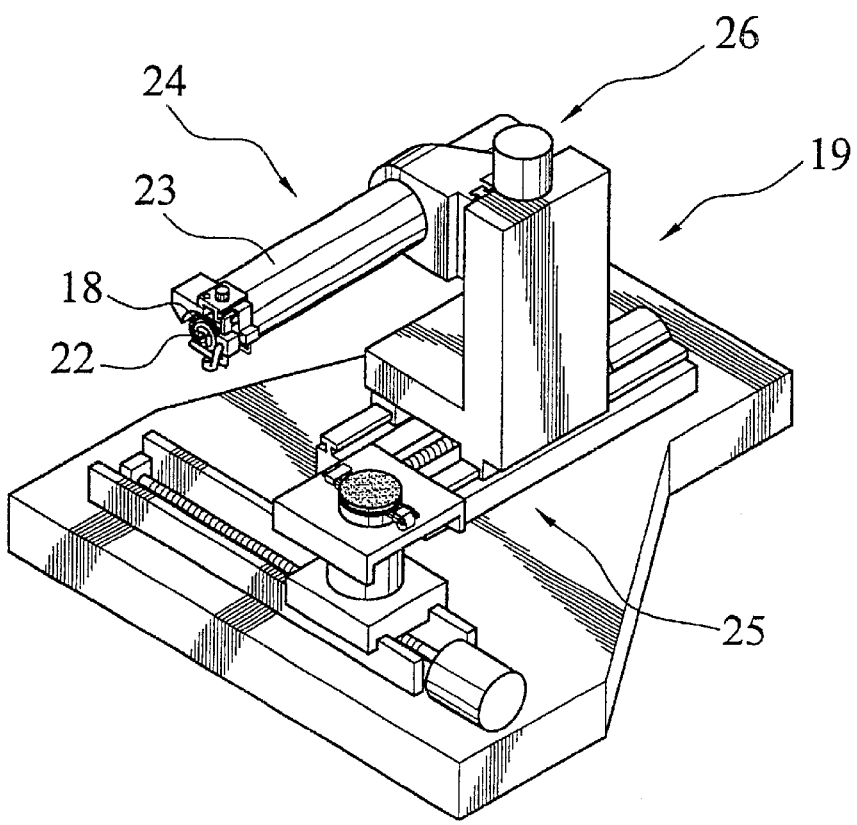
FIG. 2 is a perspective view of the cutting means of the dicing apparatus of FIG. 1.

Referring to FIG. 2, the cutting means 19 is composed of the dicing blade 18 as the spindle unit 24 having the rotary spindle 22 rotatably supported by the spindle housing 23, and a Y-axial slider 25 for moving the spindle unit 24 in the Y-axial direction and an X-axial slider 26 for moving the spindle unit 24 in the X-axial direction.

Figure 3:
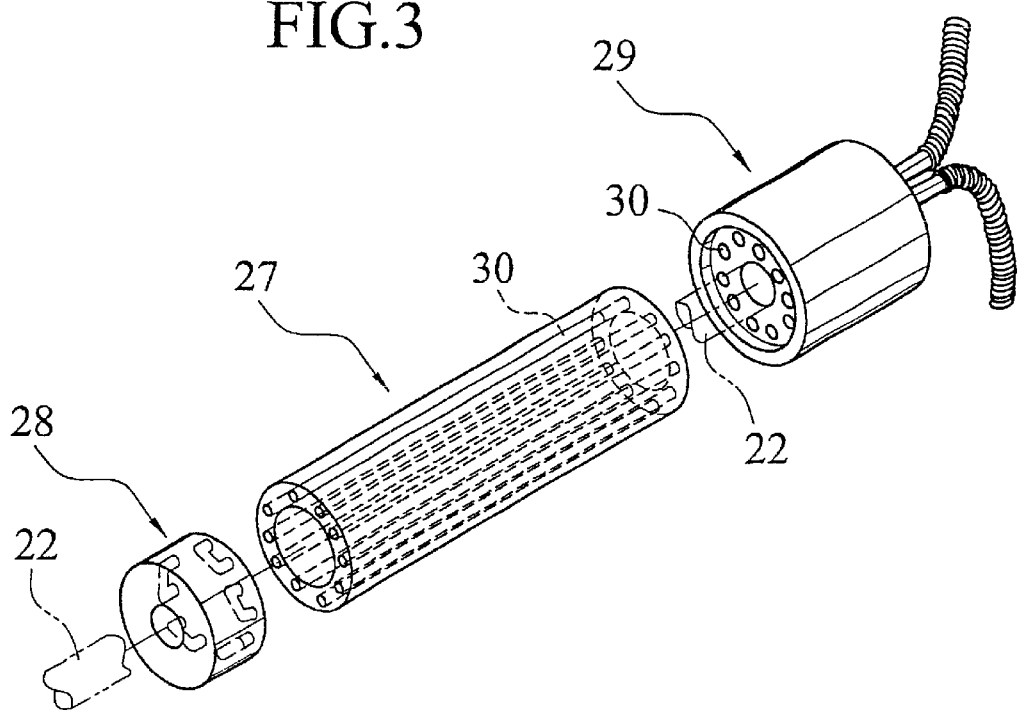
FIG. 3 is a perspective view of the spindle housing of the cutting means.

As shown in FIG. 3, the spindle housing 23 comprises a cylindrical body 27, a tip piece 28 and a base 29 containing a synchronous motor 29a, all parts being connected together.

The rotary spindle 22 can be inserted in the hollow cylinder body 27, which has coolant channels 30 formed longitudinally in its circumferential thickness to communicate with the corresponding coolant channels of the base 29. One half of the coolant channels 30 are connected to cooling water source 32 via a first control valve 31 whereas the other half of the coolant channels 30 are connected to a drain.

The tip piece 28 has reentrant channels formed therein. Each reentrant channel is connected on one end to a selected coolant-feeding channel, which is connected to the cooling water supply 32, and connected on the other end to a selected coolant-removing channel, which is connected to the drain. With this arrangement the cooling water passes from the cooling water supply 32 to the drain via the coolant-feeding channels, the reentrant channels and the coolant-removing channels.

Figure 4:
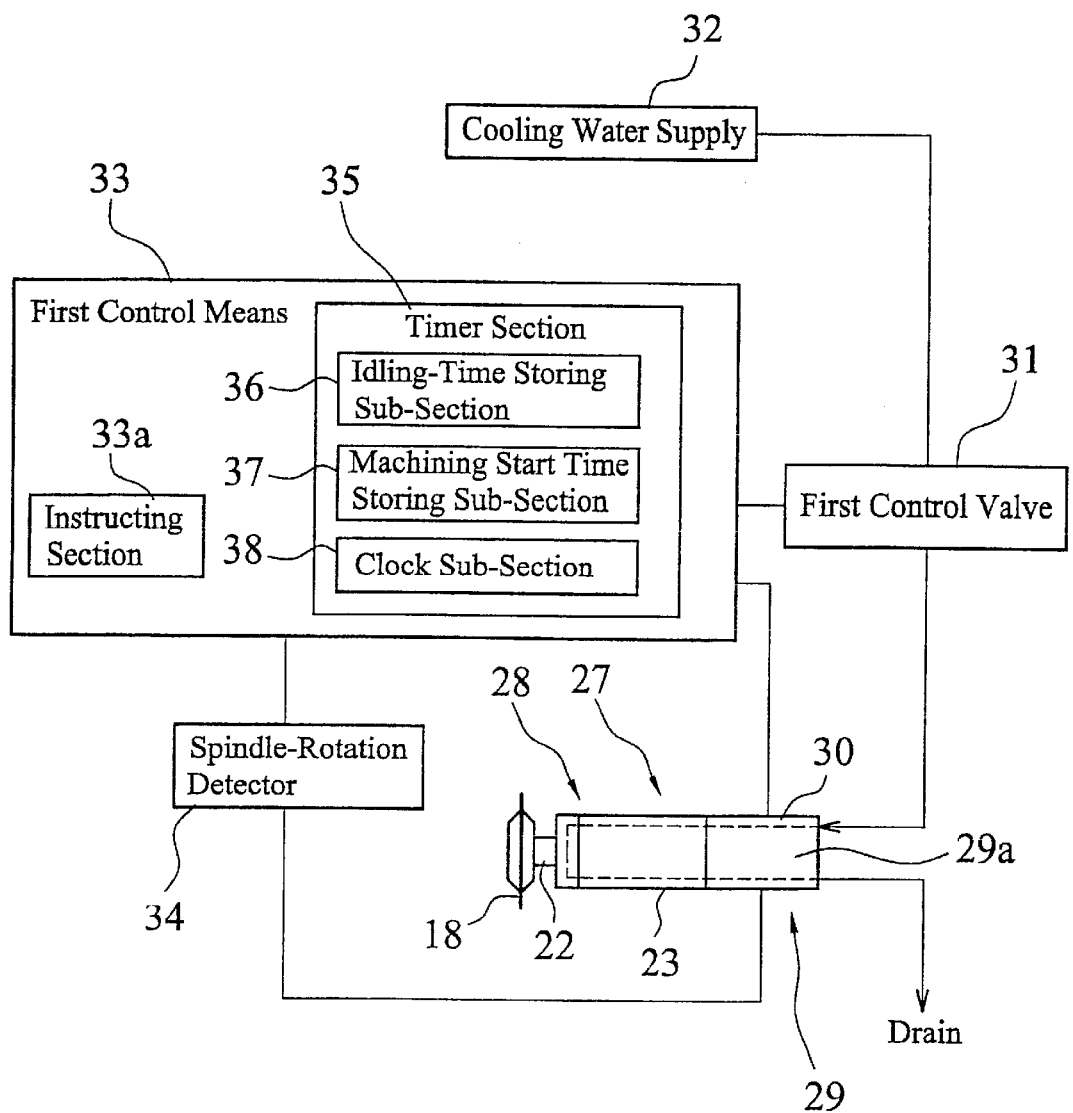
FIG. 4 is a block diagram of a control system for supplying the spindle housing with cooling water.

Referring to FIG. 4, the first control valve 31 is connected to the joint between the cooling water source 32 and the coolant feeding channel 30 for controlling the flow rate of the cooling water.

The first control means 33 is connected to a spindle-rotation detector 34, which is connected to the synchronous motor 29a in the base 29 to make a decision in terms of whether the rotary spindle 22 is rotated or not. One example of such spindle-rotation detector 34 is an ampere meter.

As shown in FIG. 4, the first control means 33 comprises an instruction dispatching section 33a for dispatching an "on" or "off" instruction to the first control valve 31 and a timer section 35 for instructing the rotary spindle 22 to run at a selected time. The timer section 35 comprises an idling-time storing sub-section 36 for storing a length of time for which the rotary spindle is allowed to run idle, a machining start time storing sub-section 37 for storing time at which a required machining starts, and a time measuring section 38 informing what time it is now.

Assuming that a semiconductor wafer W held on the chuck table 15 is cutting into small squares by rotating the rotary spindle 22 having a dicing blade 18 attached thereto at an increased speed (see FIG. 1), the spindle 22 and spindle housing 23 are heated to expand somewhat in the Y-axial direction, thus allowing the dicing blade 18 to traverse the semiconductor wafer W accordingly. To prevent the dicing blade 18 from being displaced laterally, cooling water is supplied to the spindle housing 23 via the coolant channel 30, as seen from FIG. 3.

Specifically when the first control valve 31 is made to open in response to the instruction from the first control means 33, cooling water flows from the cooling water supply 32, passing through the coolant channels 30 of the spindle housing 23 to be drained.

Assuming that the machining is interrupted (for example, one hour), the spindle-rotation detector 34 detects the stopping of the rotary spindle 22, realizing that the dicing apparatus has stopped. If no cooling water were supplied to the spindle housing 23, the idling of the dicing apparatus would be necessitated while being fed with cooling water, thereby putting the dicing apparatus into the pre-interruption thermal condition before resuming the machining. With a view to eliminating the necessity of effecting such an extra idling, the dicing apparatus is supplied with a controlled small quantity of cooling water to keep the rotary spindle at the same temperature as the cooling water even after interruption of machining. Thanks to the saving of the extra idling, the workability or working efficiency can be improved accordingly.

In case that the dicing apparatus 10 stops working for a relatively long time (for example, 10 hours), the supplying of cooling water is made to stop completely. In order to assure that the dicing apparatus can resume the machining with the same accuracy as the accuracy with which it was machining prior to interruption, the dicing apparatus is allowed to run idle while the cooling water and the machining water are being supplied to the spindle housing 23 and the machining area respectively, and while the high-pressure air are being supplied to the radial bearings 39 and the thrust bearings 40, allowing the rotary spindle 22 and the dicing blade 18 to rotate at an increased speed. Thus, while the dicing apparatus is running idle, the cooling water and high-pressure air are drained all the time.

The idling-time storing sub-section 36 of the first control means 33 stores a predetermined length of time for idling, and the machining start time storing sub-section 37 stores time scheduled for resuming the machining (see FIG. 4). These sub-sections are set for idling and resuming by using the console 70.

When the length of time determined by subtracting the present time given by the time measuring section 38 from the time set for resuming the machining at the machining start time storing sub-section 37 is equal to the length of time set for idling at the idling-time storing sub-section 36, the first control valve 31 is made to open automatically, thus supplying the cooling water to the coolant channel 30, and at the same time, the synchronous motor 29a is driven.

Figure 5:
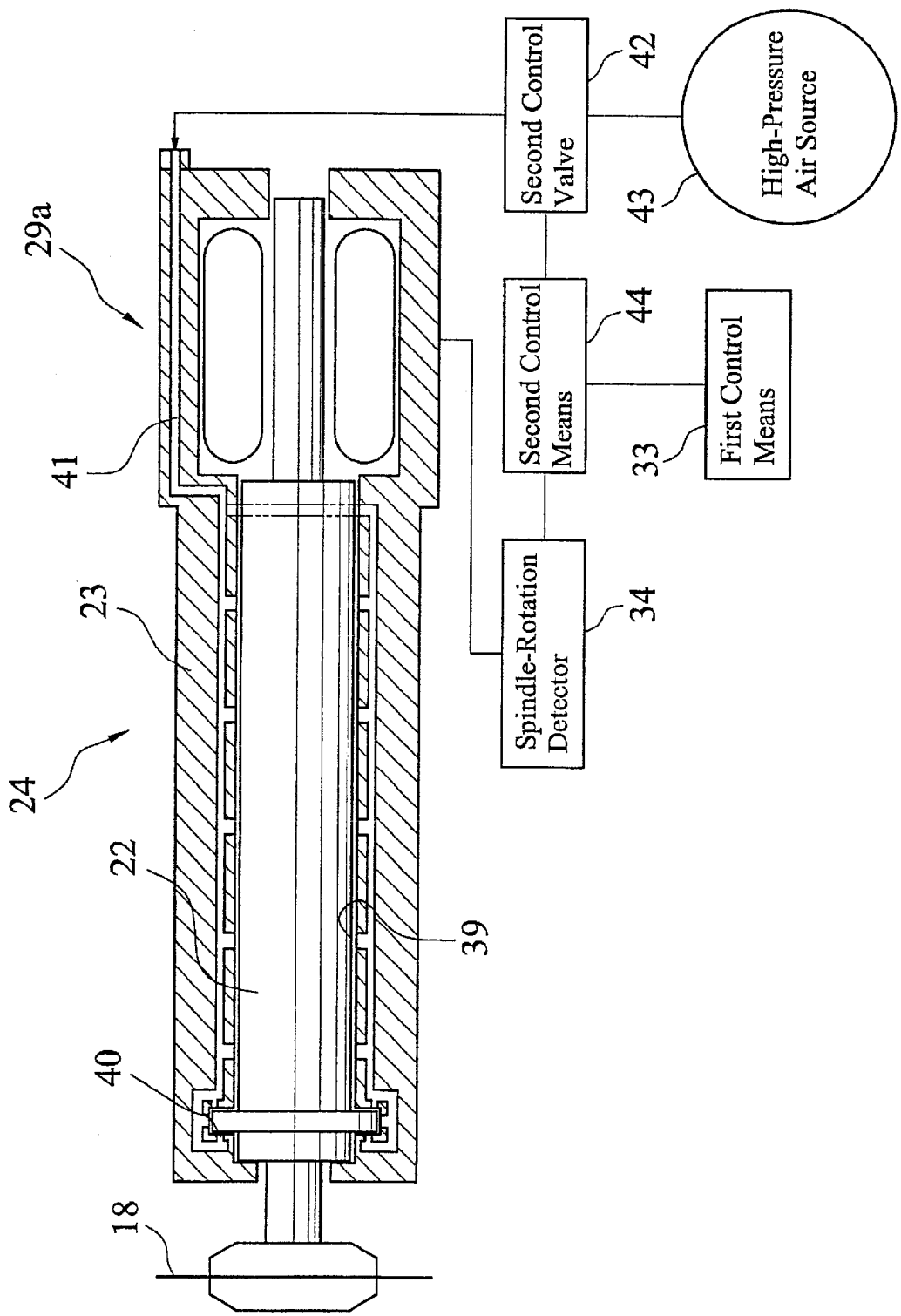
FIG. 5 is a block diagram of a control system for supplying the spindle housing with a controlled high-pressure air.

At the same time, an air stream of high-pressure is supplied to the radial pneumatic bearings 39 and the thrust pneumatic bearing 40 of the spindle housing 23 via the air channel 41 to suspend the rotary spindle 22 within the spindle housing 23, as seen from FIG. 5.

As shown in the drawing, the air channel 41 is connected to the compressed air source 43 via the second control valve 42. The second control valve 42 is connected to the second control means 44, thereby allowing the second control valve 42 to be opened under the control of the second control means 44. Specifically the first control means 33 dispatches an idling start instruction to the second control means 44 so that the second control means 44 puts the second control valve 42 in its opening position, thereby communicating the air channel 41 with the compressed air source 43. The first control means 33 allows the synchronous motor 29a to start running approximately 10 seconds later.

The second control means 44 is connected to the spindle-rotation detector 34. The spindle-rotation detector 34 detects that the rotary spindle 22 is put in the "off" condition after the required machining is completed, and then, the rotary spindle 22 stops completely subsequent to the continuous running under its inertia, which lasts for instance, 60 seconds after the "off" condition. Then, the second control means 44 puts the second control valve 42 in its closing position. Thus, the compressed air can be saved.

Figure 6:
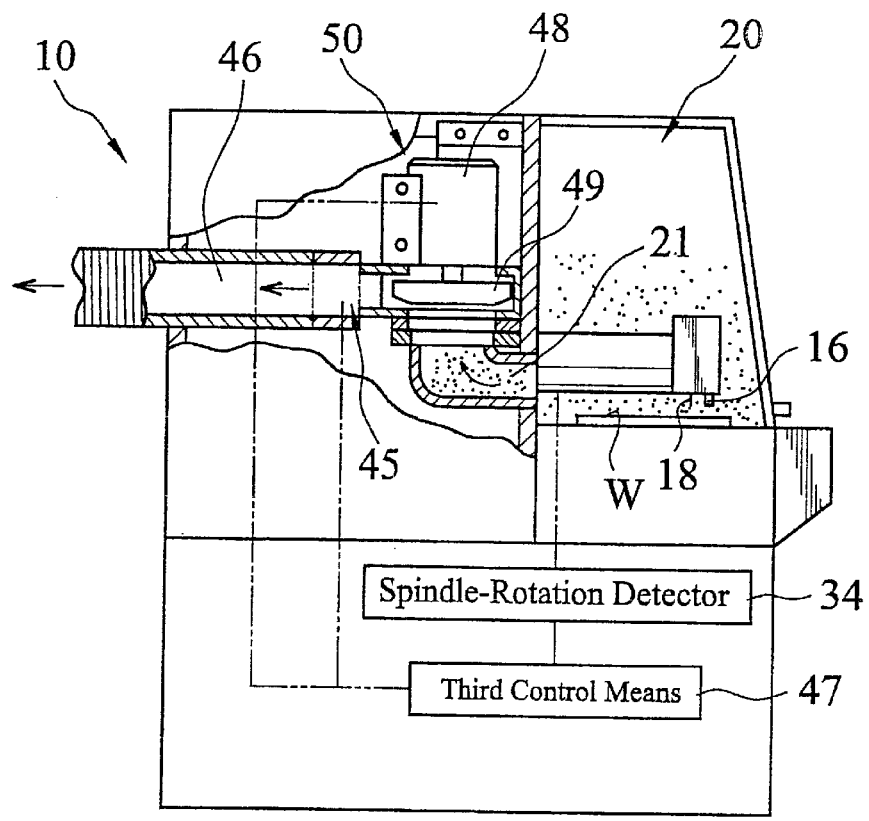
FIG. 6 is a block diagram of a control system for drawing the mist from the working area.

Referring to FIG. 6, the dicing apparatus has a drain opening 21 in its machining area 20, which drain opening 21 is connected to the drain duct 46 via the third control valve 45.

Figure 7:
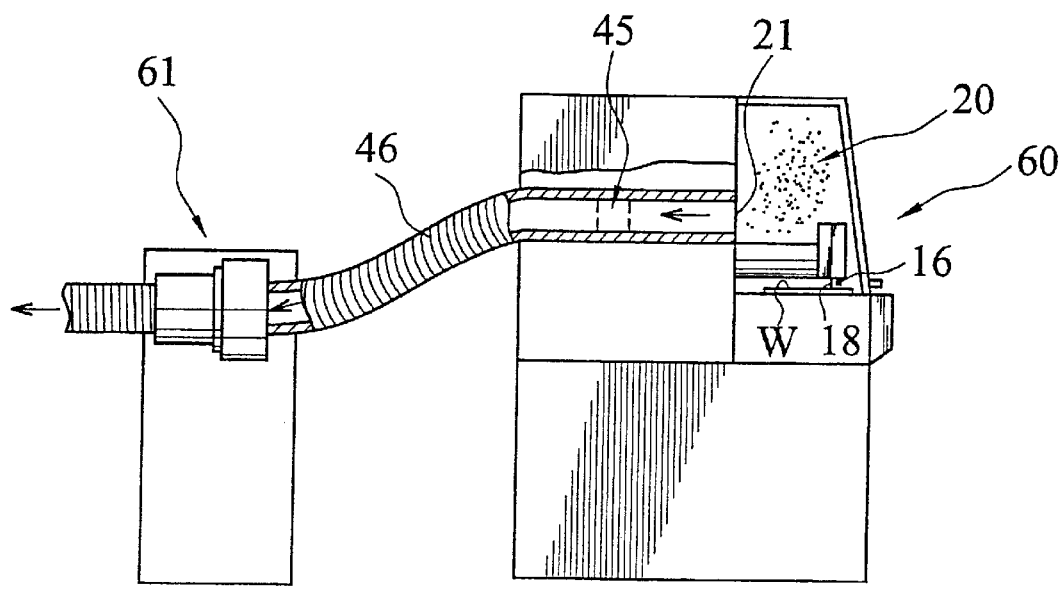
FIG. 7 is a block diagram of another control system for drawing the debris-abundant mist from the working area.

The third control valve 45 is connected to the third control means 47, which in turn, is connected to the spindle-rotation detector 34. The third control valve 45 is opened when the spindle-rotation detector 34 detects the rotary spindle 22 rotating, and the third control valve 45 is closed when the spindle-rotation detector 34 detects the rotary spindle 22 stopping. When machining water is ejected toward the machining area 20, the mist is produced, and the so produced mist is drawn into the duct 46 by rotating an extractor fan 50, which is driven by an associated motor 48. When the rotary spindle 22 is stopped to produce no mist, the motor 48 is stopped under the control of the third control means 47. As seen from FIG. 7, the dicing apparatus 60 may have the fan 61 positioned outside of the apparatus.

When the first control means 33 allows the rotary spindle 22 to rotate, the spindle-rotation detector 34 detects the rotary spindle 22 turning, and then, the third control means 47 realizes that the cutting of a semiconductor wafer starts, putting the third control valve 45 in its opening position, thereby drawing the mist from the machining area 20.

When the cutting is finished, the spindle-rotation detector 34 detects the rotary spindle 22 stopping, and then, the third control means 47 realizes that the cutting of the semiconductor wafer is finished, putting the third control valve 45 in its closing position, or stopping the running of the fan 50, thereby stopping the demisting operation. Thus, the demisting operation is made to cease in response to the stopping of the rotary spindle 22, thereby limiting exhaustion of expensive clean air to possible minimum.

As may be understood from the above, the feeding of cooling water and high-pressure air, and the drawing of the mist are effected continuously so long as the rotary spindle 22 is running, and such feeding and drawing operations are made to stop in response to the stopping of the rotary spindle 22. Thus, the quantity of cooling water and high-pressure air to be supplied and the quantity of clean air to be wasted can be reduced to possible minimum. This is significantly advantageous from the point of economical view. An automatic idling is performed to the extent that same machining accuracy is assured after the machining is resumed.

All of the first, second and third control valves 31, 42 and 45 are described as being capable of opening and closing, thereby controlling the feeding of cooling water, the feeding of high-pressure air, and the drawing of clean air. When occasions do not require the entire first, second and third control valves 31, 42 and 45, selected one or ones may be used to meet occasional demand.

Figure 8:
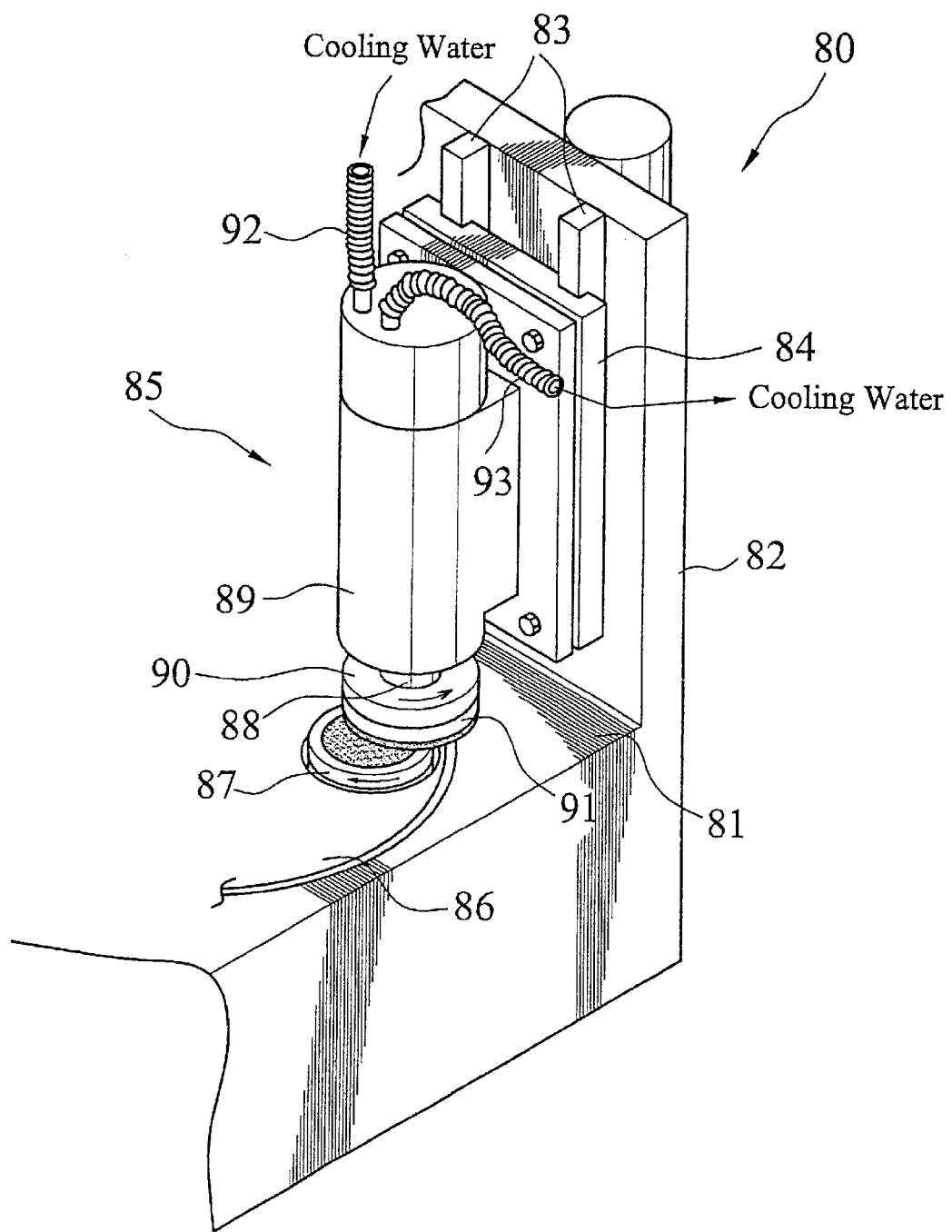
FIG. 8 is a perspective view of a grinding apparatus to which the present invention can be applied.
Figure 9:
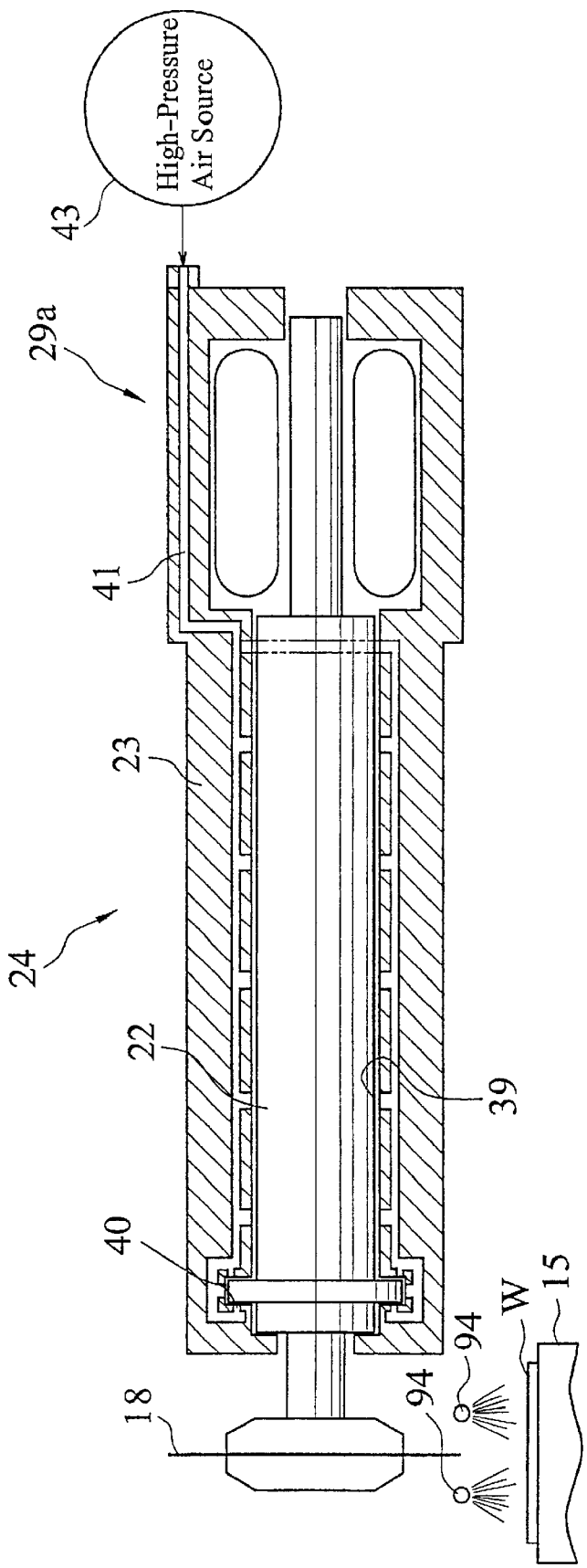
FIG. 9 is a longitudinal section of the spindle unit of a conventional dicing apparatus.

The present invention can be equally applied to machining apparatus other than the dicing apparatus. One example of such machining apparatus is a grinding apparatus 80 as shown in FIG. 8. The grinding apparatus 80 has a vertical wall 82 rising upright from the rear end of the base 81 thereof, and the vertical wall 82 has a pair of rails 83 fixed on its front. A slide plate 84 is slidably attached to the opposite rails 83. The slide plate 84 has a spindle unit 85 fixed thereon. The base 81 has a turntable 86 rotatably fixed to its upper surface, and the turntable 86 has a chuck table 87 for holding a workpiece such as a semiconductor wafer. As the slide plate 84 is raised and lowered, the spindle unit 85 is raised and lowered so that it may be brought close to and apart from the semiconductor wafer held by the chuck table 87.

The spindle unit 85 has a rotary spindle 88 rotatably supported in its housing 89, and the rotary spindle 88 has a mount 90 fixed to its end. A grinding wheel 91 is attached to the mount 90 so that the grinding wheel 91 may be driven by rotation of the rotary spindle 88.

In operation the semiconductor wafer held on the chuck table 87 is brought just under the grinding wheel 91, and then, the spindle unit 85 is lowered while the rotary spindle 88 is rotated. Water is ejected toward the machining area, and the rotary spindle 88 and the grinding wheel 91 are rotated at an increased speed to be pushed against the semiconductor wafer, thereby grinding the semiconductor wafer.

The rotary spindle 88 is suspended by the high-pressure air ejected from the radial and thrust bearings of the spindle housing 89 in the same way as the spindle unit 24 of FIG. 5. Preferably the feeding of high-pressure air to the spindle housing 89 is stopped when the rotary spindle 88 is not driven.

The thermal expansion of the rotary spindle 88 will cause an error in grinding the semiconductor wafer to a desired thickness. To prevent the thermal expansion of the rotary spindle 88, cooling water is made to flow in the spindle housing 89, passing from the inlet 92 to outlet conduit 93 through the coolant channel of the spindle housing 89. Preferably the feeding of cooling water to the spindle housing 89 is stopped when the rotary spindle 88 is not driven.

As is the case with the dicing apparatus, the grinding apparatus uses a spindle-rotation detector and a flow control responsive to a signal from the spindle-rotation detector representing non-rotation of the rotary spindle 88 for stopping the feeding of cooling water and high-pressure air, which is advantageous from the point of economical view.

As may be understood from the above, when the rotary spindle of the dicing apparatus, the grinding apparatus or any other machining apparatus is not running, the feeding of cooling water and high-pressure air, and removal of clean air for demisting are stopped automatically, thereby preventing these fluids from being wasted, which is advantageous from the point of economical view.

Also, the feeding of machining water can be made to start or stop dependent on whether the rotary spindle is driven or not, thereby making an effective, economical use of machining water While the rotary spindle is not running, a controlled small amount of cooling water is allowed to flow in the spindle housing, thereby keeping the rotary spindle at the same temperature as the cooling water all the time. Thus, idling preliminary to resumption of machining can be omitted, and the workability or working efficiency can be improved accordingly.

Even if the feeding of cooling water has been stopped completely, a required idling prior to resumption of machining can be automatically effected by feeding cooling water to the spindle housing for a stretch of time long enough to provide the same thermal condition as was prevailing before the machining was stopped, thereby assuring that the machining be effected with same accuracy.

What is claimed is:

1. A machining apparatus comprising:

at least means for holding a workpiece to be machined;

a spindle unit comprising a rotary spindle having a machining element attached thereto for effecting a required machining work on the workpiece and a spindle housing rotatably bearing said rotary spindle; and means for supplying said spindle unit with fluid for use in machining said workpiece, wherein means for supplying said spindle unit with fluid includes a flow control provided in a fluid flowing passage for controlling the flow rate of said fluid in response to the rotating and stopping of said rotary spindle and wherein said means for supplying said spindle unit with fluid comprises at least a cooling water source, a cooling feeding conduit for feeding said spindle housing with cooling water, and a coolant draining conduit for draining all the cooling water from said spindle housing after use; said coolant feeding conduit having a first control valve as said flow control, thereby reducing or stopping cooling water to said spindle housing when said rotary spindle is not rotating.

2. A machining apparatus according to claim 1, wherein said spindle housing has a pneumatic bearing for bearing said rotary spindle with high-pressure air, said spindle housing being connected to a high-pressure air supply via an associated air duct.

3. A machining apparatus according to claim 2, wherein said air duct is equipped with a second control valve as air flow control, which is responsive to non-rotating of said rotary spindle for preventing the high-pressure air from flowing to said spindle housing.

4. A machining apparatus according to claim 1, further comprising demisting means for drawing and removing the mist from the working area where the machining element confronts the workpiece, allowing machining liquid to sputter in the form of mist, said demisting means including a duct opening at the working area for drawing the mist from the working area, said duct being equipped with a flow control.

5. A machining apparatus according to claim 4, wherein said flow control comprises a fan and/or a third control valve, which may be made to stop its rotation or may be closed in response to absence of mist.

* * * * *